A. H. SIBLEY AND G. L. VAN ALLEN.
TUBE TOOTH AND CROWN.
APPLICATION FILED OCT. 8, 1921.

1,423,628. Patented July 25, 1922.

INVENTORS.
Amos H. Sibley and
George L. Van Allen,
BY
Everett Rook,
ATTORNEYS.

UNITED STATES PATENT OFFICE.

AMOS H. SIBLEY, OF SHIPBOTTOM, AND GEORGE L. VAN ALLEN, OF NEWARK, NEW JERSEY, ASSIGNORS TO GENERAL DENTAL MFG. CO., A CORPORATION OF NEW JERSEY.

TUBE TOOTH AND CROWN.

1,423,628.   Specification of Letters Patent.   Patented July 25, 1922.

Application filed October 8, 1921. Serial No. 506,238.

*To all whom it may concern:*

Be it known that we, AMOS H. SIBLEY and GEORGE L. VAN ALLEN, both citizens of the United States, and residents, respectively, of Shipbottom, in the county of Ocean and State of New Jersey, and Newark, in the county of Essex and State of New Jersey, have invented new and useful Improvements in Tube Teeth and Crowns, of which the following is a specification.

This invention relates in general to artificial teeth and more particularly to what are commonly termed "tube" teeth and crowns, one object of the invention being to provide a tube tooth or crown embodying novel features of construction whereby it will be held against both revolving and longitudinal movement on the post in a bridge or the like to restrain the tooth from being accidentally pulled off the post.

Further objects of the invention are to provide a tube tooth or crown having the walls of the opening therein serrated or roughened in lines at an inclinnation to an axial plane of said opening so that the cement conforms to said serrations to restrain both revolving and longitudinal movement of the tooth relatives to the cement between it and the supporting wire; to provide a tube tooth or crown having the walls of the opening therein formed with a groove or rib extending circumferentially and longitudinally of said opening; to provide a tube tooth having the walls of the opening therein formed with a plurality of spiral grooves or ribs extending in opposite directions; to provide a tube tooth the walls of the opening in which are formed with a plurality of intersecting grooves extending circumferentially and longitudinally of said opening; to provide a tube tooth or crown opening; the walls of the opening therein formed with a plurality of intersecting spiral grooves, and to obtain other results and advantages as may be brought out by the following description.

Referring to the accompanying drawings, in which like numerals of reference indicate the same parts throughout the several views, Figure 1 is a vertical longitudinal sectional view through a tube tooth or crown constructed in accordance with our invention showing the same applied to one end of a post which is utilized for mounting the tooth on a root bridgework or the like, the root engaging portion of the post being broken away.

In its broader aspects our invention consists in roughening or serrating the walls of the opening in a tube tooth or crown in lines inclined to the axial planes of the opening so that revolution or longitudinal movement of the tooth on a supporting wire is restrained so that the tooth will be securely held on the post and prevented from being accidentally pulled out of the bridgework or the like.

Figure 1:
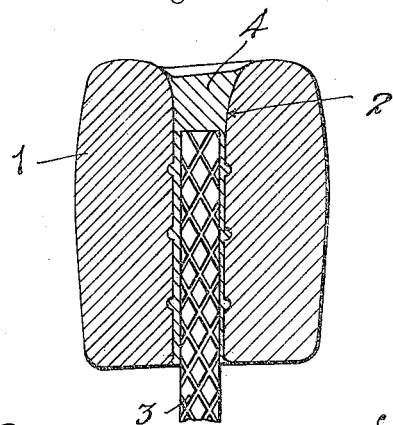
Figure 2:
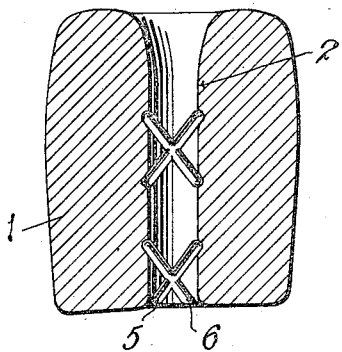
Figure 2 is a vertical sectional view through the tooth detached from the post.
Figure 3:
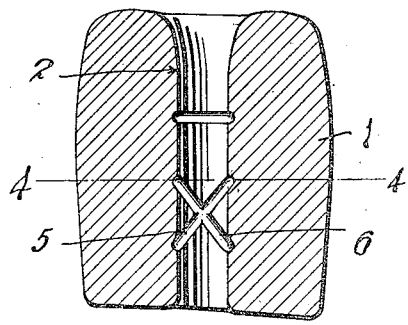
Figure 3 is a similar view taken from a position at an angle of 180° to that shown in Fig. 2.
Figure 4:
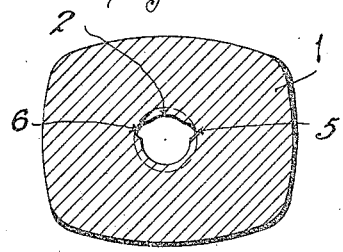
Figure 4 is a horizontal sectional view taken on the line 4—4 of Fig. 3.

In the embodiment of our invention shown on the drawings the reference character 1 designates an artificial tube tooth having the usual longitudinal opening 2 therein which is adapted to receive a supporting post 3 for securing the tooth to bridgework or the like, the tooth being secured on the post by means of suitable cement 4 which also closes the outer end of the opening. For the purpose of illustration we have shown the serrations or roughness on the walls of the opening 2 consisting of two spiral grooves 5 and 6 which extend both longitudinally and circumferentially of the opening 2 and intersect each other at various points on opposite sides of the opening 2, as shown in Figures 2 and 3. It will thus be seen that when the tooth is cemented on a supporting post 3 the right and left hand grooves 5 and 6 will restrain revolution of the tooth on the wire and also restrain the tooth from being pulled longitudinally from the wire, due to the inclination of the grooves to axial planes of the opening 2. To further insure against revolution and longitudinal movement of the tooth on the supporting wire, the post may be roughened or knurled, as shown in Figure 1, the knurling forming inclined grooves to which the cement will conform as it does to the walls of the grooves 5 and 6, the cement thus having a plurality of ribs seated in the grooves 5 and 6 of the tooth and the knurling of the post 3 so as to form a secure interlocking of the cement with the tooth and post. It will be observed that the grooves 5 and 6 have the same effect as would grooves extending circumferentially of the opening the plane of which would intersect the axial plane at right angles, and other grooves extending longitudinally of the opening and in axial planes of the opening.

The serrating or roughening of the walls of the opening 2 may be accomplished in any suitable manner. The grooves 5 and 6 form angularly disposed shoulders at their intersections and shoulders arranged at inclinations to axial planes of the opening, and it will be understood that instead of grooves as shown, the walls of the opening may be formed with similarly disposed ribs or projections.

While we have shown and described one embodiment of our invention in the walls of the opening of a tube tooth or crown, it will be understood that this is only for the purposes of illustration, and that many modifications and changes may be made therein without departing from the spirit or scope of the invention. Therefore, we do not desire to be understood as limiting ourselves except as required by the following claims when construed in the light of the prior art.

Having thus described the invention, what we claim is:

1. A tube tooth or crown having the walls of the opening therein roughened in lines extending circumferentially and longitudinally of said opening.

2. A tube tooth or crown having the walls of the opening therein formed with a groove extending circumferentially and longitudinally of said opening.

3. A tube tooth or crown having the walls of the opening therein formed with intersecting grooves.

4. A tube tooth or crown having the walls of the opening therein formed with a plurality of grooves extending circumferentially and longitudinally of said opening in opposite directions.

5. A tube tooth or crown having the walls of the opening therein formed with a plurality of intersecting spiral grooves.

6. A tube tooth or crown having the walls of the opening therein formed with a plurality of angularly disposed shoulders.

7. An artificial tooth including a tooth body having an opening therein the walls of which are formed with a plurality of intersecting grooves, and a post having a plurality of intersecting spiral grooves on its surface cemented in said opening in the tooth body, said grooves in the tooth and said post receiving the cement so as to restrain relative revolving or longitudinal movement of said tooth body and said post.

AMOS H. SIBLEY.
GEORGE L. VAN ALLEN.